United States Patent
Paschoalini et al.

(10) Patent No.: US 8,234,997 B2
(45) Date of Patent: Aug. 7, 2012

(54) CRUMB BREADING DISTRIBUTION SYSTEM

(75) Inventors: Frank Paschoalini, Huron, OH (US); Jacob Deehr, Milan, OH (US)

(73) Assignee: John Bean Technologies Corporation, Chicago, IL (US)

(*) Notice: Subject to any disclaimer, the term of this patent is extended or adjusted under 35 U.S.C. 154(b) by 1001 days.

(21) Appl. No.: 12/221,093

(22) Filed: Jul. 31, 2008

(65) Prior Publication Data
US 2009/0038542 A1    Feb. 12, 2009

Related U.S. Application Data

(60) Provisional application No. 60/963,058, filed on Aug. 1, 2007.

(51) Int. Cl.
*B05C 19/06* (2006.01)
(52) U.S. Cl. .............. 118/13; 118/24; 118/27; 118/308; 99/494
(58) Field of Classification Search .................... 118/13, 118/24, 27, 308; 99/494; 426/289
See application file for complete search history.

(56) References Cited

U.S. PATENT DOCUMENTS

| | | | |
|---|---|---|---|
| 2,845,040 A | 7/1958 | Ray | |
| 2,865,766 A | 12/1958 | Christianson et al. | |
| 3,314,575 A | 4/1967 | Graham | |
| 3,602,401 A | 8/1971 | Lense | |
| 3,840,213 A | 10/1974 | Kormos | |
| 3,967,583 A | 7/1976 | Booth | |
| 4,333,415 A | 6/1982 | Miller et al. | |
| 5,052,330 A | 10/1991 | Stacy | |
| 5,238,493 A | 8/1993 | Miller | |
| 5,647,905 A | 7/1997 | Bertrand et al. | |
| 5,732,829 A * | 3/1998 | Smith | 209/639 |
| 2006/0156931 A1 | 7/2006 | Mather et al. | |

FOREIGN PATENT DOCUMENTS

| | | | |
|---|---|---|---|
| BE | 498152 | | 1/1951 |
| EP | 0548491 | * | 6/1993 |
| EP | 1 300 080 A1 | | 4/2003 |
| FR | 2674227 | * | 9/1992 |
| WO | WO 02/096205 A1 | | 12/2002 |

* cited by examiner

*Primary Examiner* — Laura Edwards
(74) *Attorney, Agent, or Firm* — Henry C. Query, Jr.

(57) ABSTRACT

A distribution apparatus for a breading machine comprising a hopper having a number of hopper sections includes a downspout for conveying the breading material to the hopper and a spreader plate which is adjustably supported between the downspout and the hopper. By adjusting the position of the spreader plate relative to the hopper, the flow of breading material from the downspout may be distributed as desired between the hopper sections.

21 Claims, 6 Drawing Sheets

US 8,234,997 B2

CRUMB BREADING DISTRIBUTION SYSTEM

This application is based on and claims the benefit of U.S. Provisional Patent Application No. 60/963,058, which was filed on Aug. 1, 2007.

BACKGROUND OF THE INVENTION

The present invention is directed to breading machines which are used to coat food products with a breading material. In particular, the invention is directed to a breading machine which comprises an improved apparatus for uniformly distributing the breading material onto the food products.

Prior art breading machines are typically made to handle various types of breading materials, such as flour, free flowing breading materials and bread crumbs. Due to the differences in the flow characteristics of these materials, different distribution systems are required in order to achieve a uniform distribution of the breading material onto the food products.

Japanese style bread crumbs, which are commonly referred to as J crumbs, differ from flour and free flowing breading materials in that the individual J crumbs break down into smaller particles as they pass through the breading machine. The breakdown of the J crumbs increases the density of the material and thereby affects the flow characteristics of the material. This breakdown also requires that the fine and course crumbs be uniformly blended before they are distributed to the food products.

J crumb breading machines have historically utilized a chute and pan distribution system to evenly distribute the fine and course crumbs within the breading machine in an effort to achieve a uniform top and bottom layer of the breading material across the entire width of the conveyor belt. While this system has proven to be reasonably successful, it does require an experienced operator to set-up the machine.

SUMMARY OF THE INVENTION

The inventors have discovered that a much simpler apparatus may be used to uniformly distribute the breading material to the top and bottom surfaces of the food products.

Accordingly, the present invention comprises a distribution apparatus for a breading machine which includes a hopper having a number of hopper sections. The distribution apparatus comprises a downspout for conveying a breading material to the hopper, a spreader plate which is positioned between the downspout and the hopper, and means for adjustably supporting the spreader plate relative to the hopper. In this manner, the flow of breading material from the downspout may be distributed as desired between the hopper sections by adjusting the position of the spreader plate relative to the hopper.

In accordance with one embodiment of the invention, the spreader plate comprises a generally conical configuration.

In accordance with another embodiment of the invention, the distribution apparatus further comprises a diverter plate which is adjustably supported proximate the discharge end of the downspout. In this manner, the breading material flowing through the downspout will engage the diverter plate prior to contacting the spreader plate.

In accordance with a further embodiment of the invention, the adjustable supporting means comprises a support rod which extends from the spreader plate and is adjustably connectable to the hopper. The support rod may be laterally adjustably connectable to the hopper, axially adjustably connectable to the hopper and/or rotationally adjustably connectable to the hopper.

In accordance with yet another embodiment of the invention, the adjustable supporting means further comprises first and second block members, each of which is connected to a corresponding end of the support rod, and first and second cleat members, each of which is connected to a corresponding portion of the hopper. In this embodiment, each of the first and second block members is adjustably connectable to a corresponding one of the first and second cleat members. Each of the first and second block members may laterally adjustably connectable to its corresponding cleat member and/or axially adjustably connectable to its corresponding cleat member. In addition, the support rod may be rotatably connectable to each of the first and second block members.

During normal operation of the breading machine, the crumbs which comprise the breading material will separate as the breading material flows through the downspout. However, the diverter plate at the end of the downspout will serve to mix the crumbs to a uniform consistency. The diverter plate is ideally adjustable to achieve a desired degree of mixing of the crumbs. The diverter plate then distributes the mixed breading material on to the spreader plate. The spreader plate is located approximately in the center of the flow of breading material, which results in a uniform flow of fine and course crumbs on each of the top and bottom layers of the food products.

Thus, the present invention provides a simple but effective means of uniformly distributing the breading material to the top and bottom layers of the food products.

These and other objects and advantages of the present invention will be made apparent from the following detailed description, with reference to the accompanying drawings. In the drawings, the same reference numbers are used to denote similar components in the various embodiments.

DETAILED DESCRIPTION OF THE INVENTION

Figure 1:
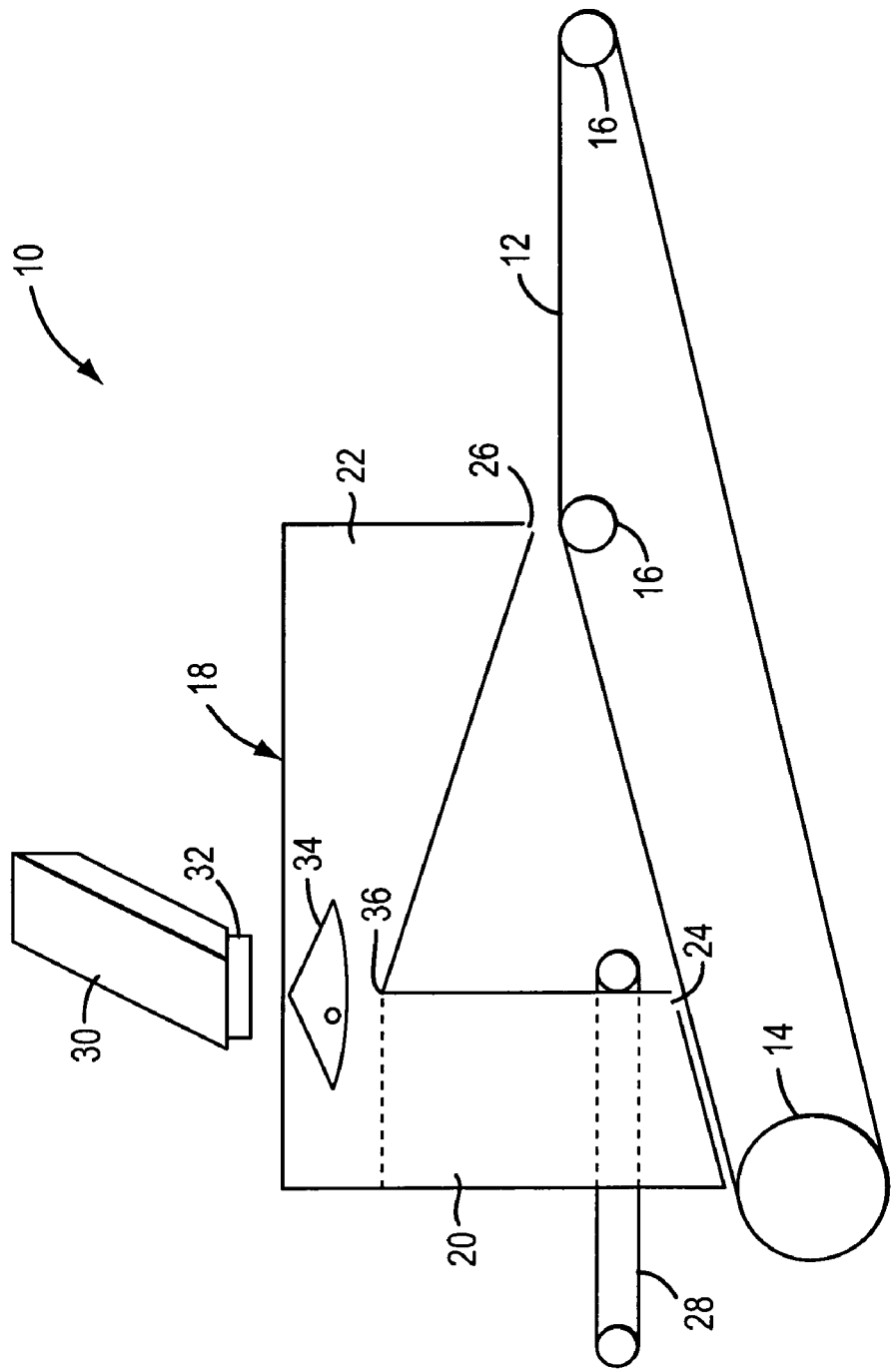
FIG. 1 is a schematic representation of the crumb breading distribution system of the present invention shown incorporated into an exemplary breading machine.

Referring to FIG. 1, the crumb breading distribution system of the present invention is shown incorporated into an exemplary breading machine 10. The breading machine 10 comprises a main conveyor belt 12 which is driven by a drive roller 14 and is guided along its length by a number of idler rollers 16. The upper run of the conveyor belt 12 is positioned below a hopper 18 which is divided into a first hopper section 20 and a second hopper section 22. The first and second hopper sections 20, 22 comprise respective first and second discharge openings 24, 26, each of which preferably extends substantially the entire width of the main conveyor belt 12.

In operation of the breading machine 10, the breading material in the first hopper section 20 is released through the first discharge opening 24 and distributed in a uniform layer of a desired thickness on the main conveyor belt 12. The food products to be coated are then deposited onto this layer of breading material by a feed belt 28 in order to coat the bottom of the food products. The food products are then transported on the main conveyor belt 12 under the second discharge opening 26, and the breading material in the second hopper section 22 is released through the second discharge opening onto the food products in order to coat the top of the food products.

Further details of the breading machine 10 and its manner of operation are disclosed in U.S. Pat. No. 4,333,415, which is commonly owned herewith and is hereby incorporated herein by reference.

In accordance with the present invention, the crumb breading distribution system is employed to control the quantity and size of the bread crumbs which are distributed to the first and second hopper sections 20, 22. Referring still to FIG. 1, the crumb breading distribution system comprises a downspout 30 which is operatively connected to a supply of breading material (not shown), a diverter plate 32 which is supported by the downspout, and a spreader plate 34 which is positioned over a ridge 36 defining the intersection of the first and second hopper sections 20, 22. In one embodiment of the invention, the spreader plate 34 is twelve inches in diameter and is spaced three inches below the diverter plate 32.

Figure 2:
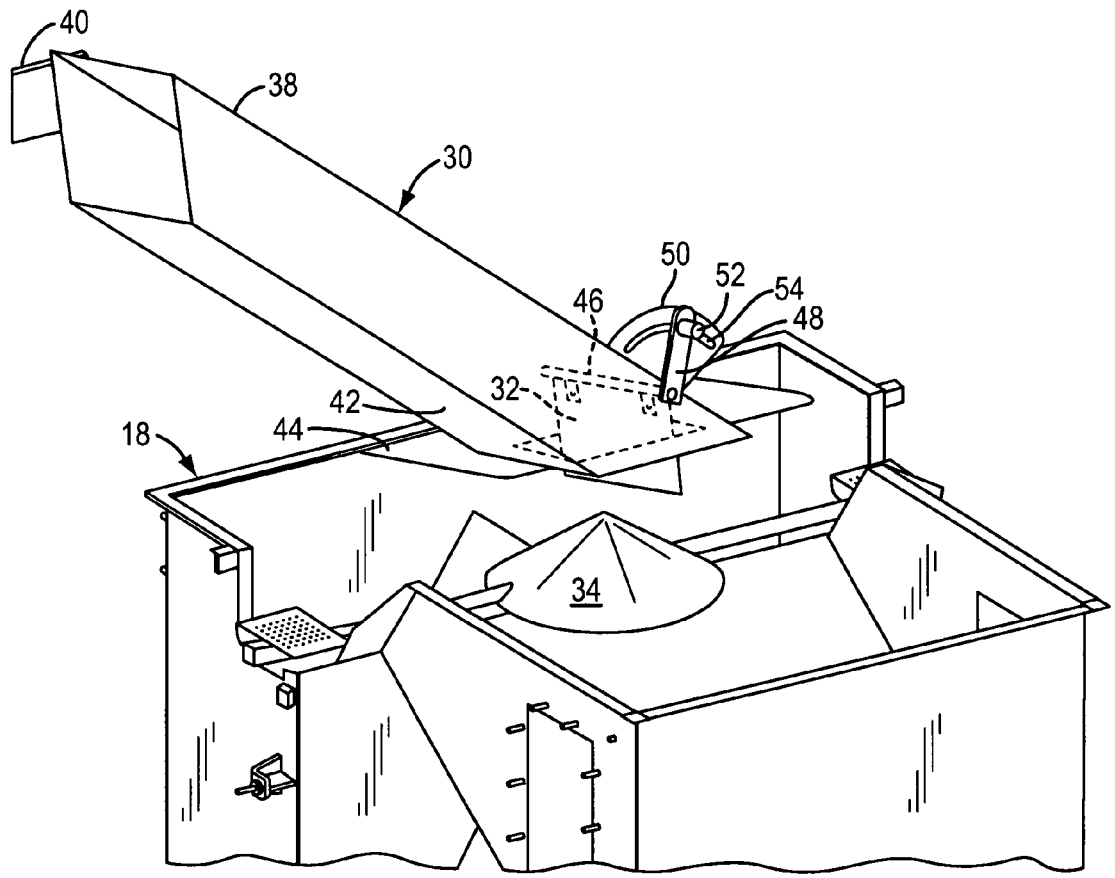
FIG. 2 is a partial perspective view of an embodiment of the crumb breading distribution system of the present invention.
Figure 3:
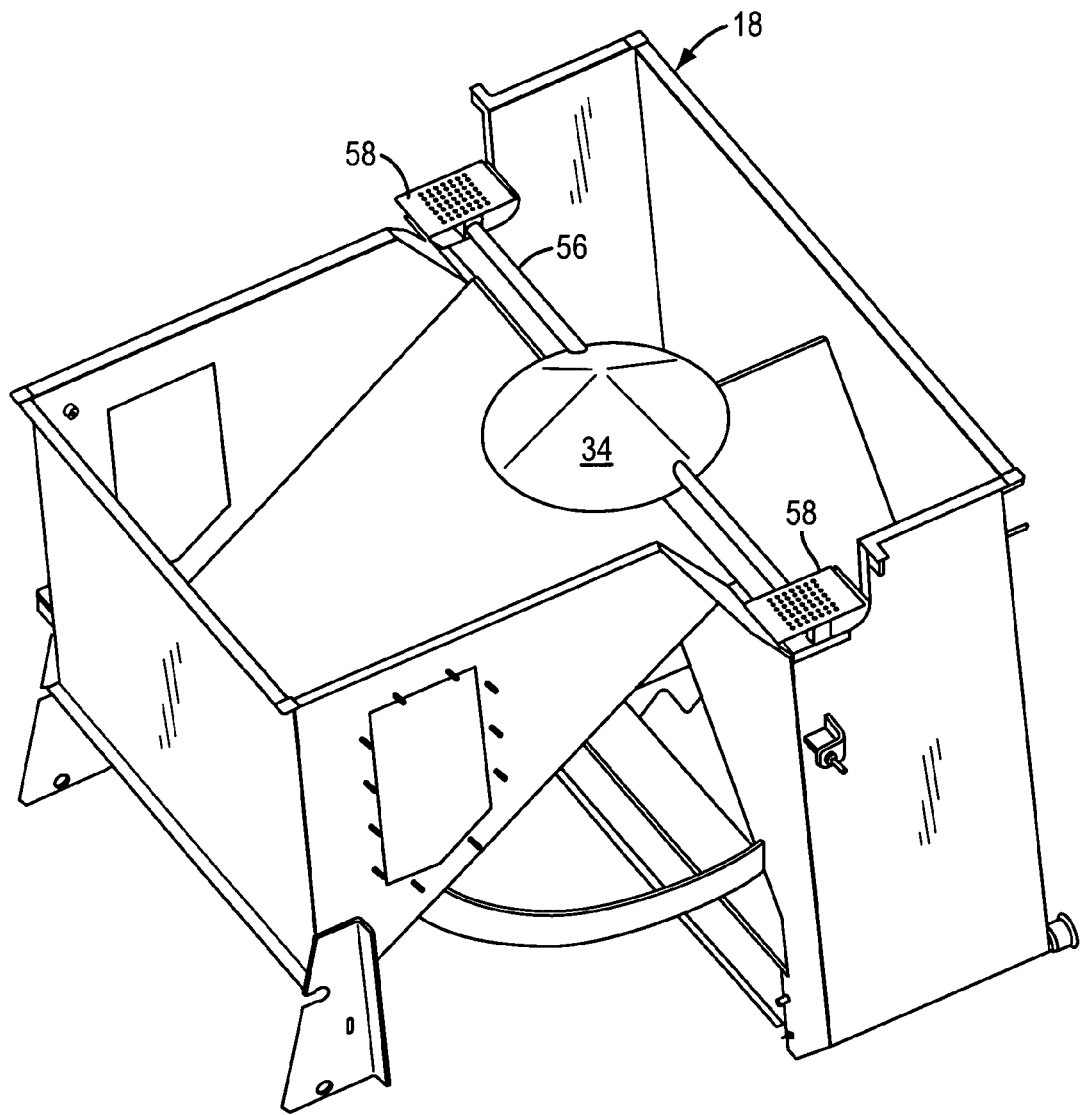
FIG. 3 is a partial perspective view of the crumb breading distribution system of the present invention, but with the downspout component of the invention removed for clarity.
Figure 4:
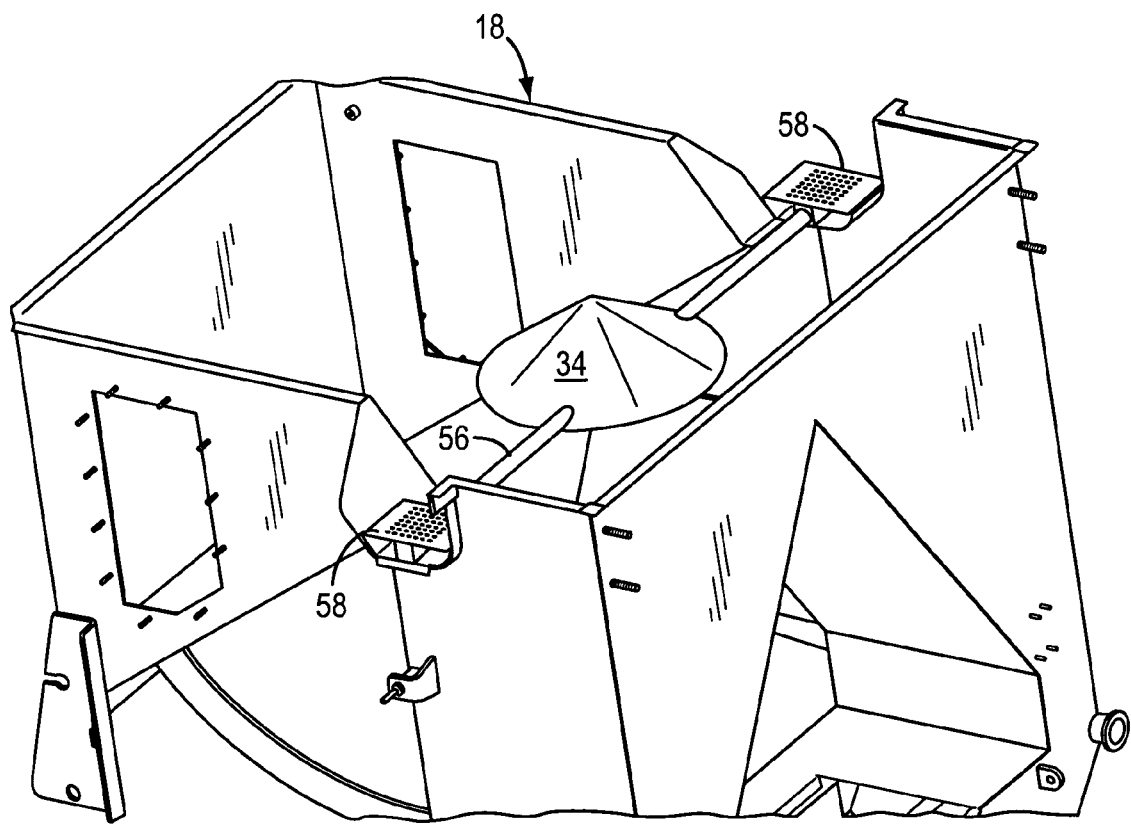
FIG. 4 is a partial perspective view of the crumb breading distribution system shown in FIG. 3, but taken at a different angle.
Figure 5:
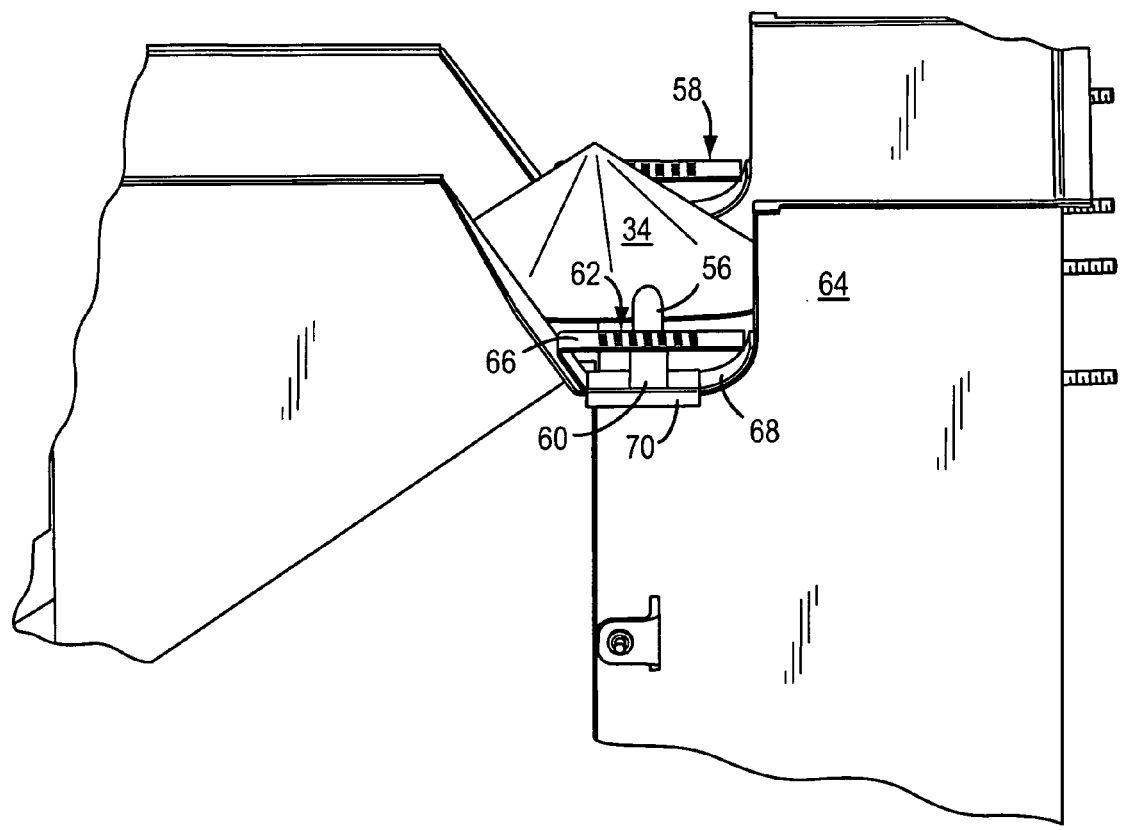
FIG. 5 is a partial side perspective view of the crumb breading distribution system shown in FIG. 3.
Figure 6:
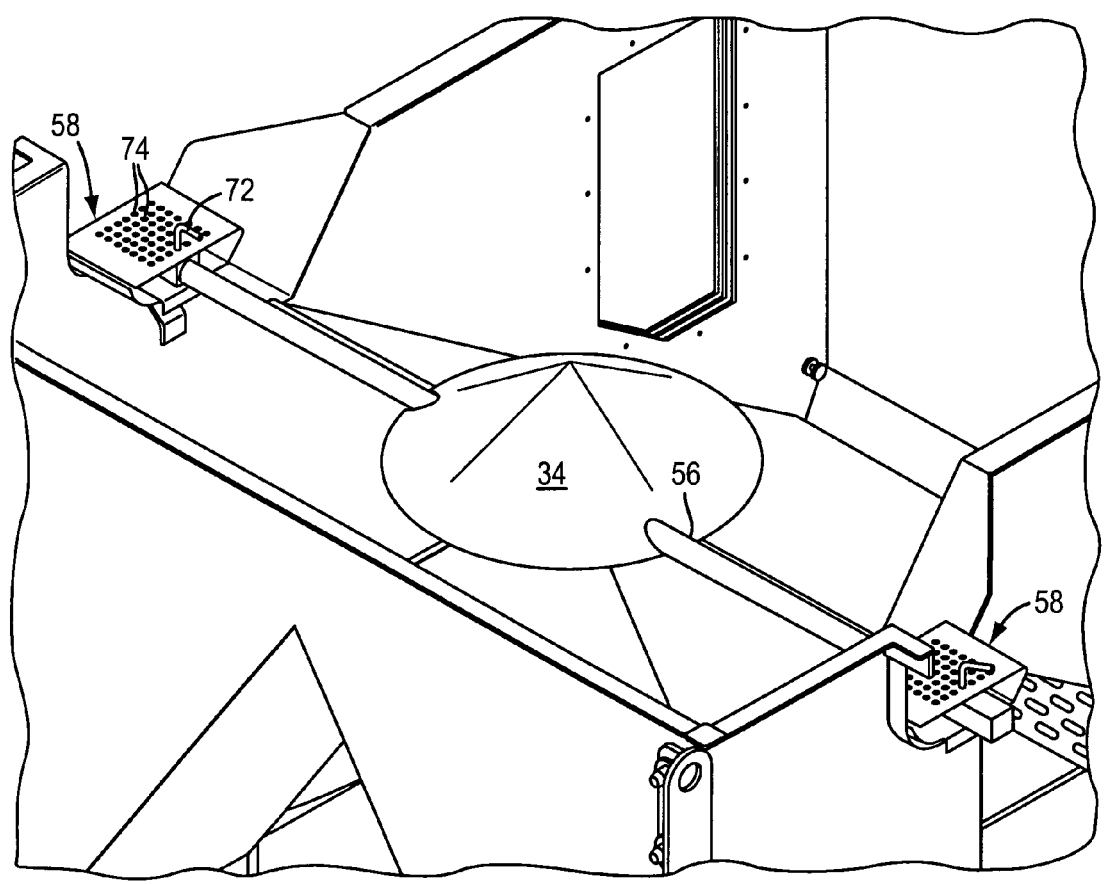
FIG. 6 is a partial perspective view of the crumb breading distribution system shown in FIG. 3, but taken at a different angle.

Referring also to FIG. 2, the downspout 30 in accordance with one embodiment of the invention comprises a tubular configuration having a generally rectangular cross section. The downspout 30 comprises an inlet end 38 which is connected via a suitable bracket 40 to a supporting frame (not shown) and a discharge end 42 which is connected to a mounting plate 44 that in turn is connected to the hopper 18.

The diverter plate 32 is connected to a pivot rod 46 which is rotationally supported in the discharge end 42 of the downspout 30. The pivot rod 46 is rigidly connected to one end of a pivot arm 48. The opposite end of the pivot arm 48 is connected to an adjustment bracket 50 by a thumb screw 52 or the like which extends through an arcuate groove 54 in the adjustment bracket. Thus, by adjusting the position of the pivot arm 48, the orientation of the diverter plate 32 within the discharge end 42 of the downspout 30 may be adjusted.

The spreader plate 34 is supported on the hopper 18 beneath the diverter plate 32. Referring also to FIGS. 3 through 6, the spreader plate 34 comprises a generally conical configuration, although it could comprise any of a variety of similar shapes and sizes depending on the width of the main conveyor belt 12, the amount of breading material which is required to be distributed to the first and second hopper sections 20, 22 and the desired depth of the breading material on the top and bottom of the food products.

The spreader plate 34 is connected to a support rod 56 which is preferably adjustably connected to the hopper 18 by a pair of mounting brackets 58. As shown most clearly in FIGS. 5 and 6, each mounting bracket 58 includes a generally rectangular block 60 within which the corresponding end of the support rod 56 is preferably rotatably received, a cleat 62 which is positioned in an opening in the corresponding sidewall 64 of the hopper 18 and which comprises upper and lower cleat portions 66, 68 between which the block is positioned, and a clamp 70 which secures the lower cleat portion to the sidewall 64. The block 60 includes a transverse threaded bore through which a corresponding bolt 72 extends to secure the block to the support rod 56. In addition, the upper cleat portion 66 includes a number of holes 74 which are arranged in a rectangular pattern. Thus, the side-to-side and front-to-back positions of the spreader plate 32 may be adjusted by positioning the bolt 72 in the appropriate hole 74. In addition, the front-to-back tilt of the spreader plate 32 may be adjusted by rotating the support rod 56 within the blocks 60 prior to tightening the bolts 72.

As the breading crumbs travel down the downspout 30, the fine crumbs will settle to the bottom of the breading flow and the lighter and coarser crumbs will separate and migrate to the top of the breading flow. However, as the breading material passes through the discharge end 42 of the downspout 30, the diverter plate 32 mixes the fine and coarse crumbs so that they are substantially evenly distributed throughout breading material by the time the material reaches the spreader plate 34. This results in a uniform distribution of the fine and course crumbs to each of the top and bottom layers of the breading material across substantially the entire width of the main conveyor belt 12.

The diverter plate 32 may comprise perforated holes as a means of improving the fine crumb distribution between the top and bottom surfaces of the food products. Also, the spreader plate 34 may comprise perforated holes as a means of improving the fine crumb distribution between the top and bottom surfaces of the food products.

It should be recognized that, while the present invention has been described in relation to the preferred embodiments thereof, those skilled in the art may develop a wide variation of structural and operational details without departing from the principles of the invention. Therefore, the appended claims are to be construed to cover all equivalents falling within the true scope and spirit of the invention.

We claim:

1. In combination with a breading machine which includes a hopper having a number of hopper sections, the improvement comprising a distribution apparatus which comprises:
   a downspout for conveying a breading material to the hopper;
   a spreader plate which is positioned between the downspout and the hopper; and
   means for adjustably supporting the spreader plate relative to the hopper;
   wherein a flow of breading material from the downspout may be distributed as desired between the hopper sections by adjusting the position of the spreader plate relative to the hopper; and
   wherein the adjustable supporting means comprises a support rod to which the spreader plate is connected, the support rod being at least one of laterally and axially adjustably connectable to the hopper.

2. The combination of claim 1, wherein the spreader plate comprises a generally conical configuration.

3. The combination of claim 1, further comprising:
   a diverter plate which is adjustably supported proximate a discharge end of the downspout;
   wherein the breading material flowing through the downspout will engage the diverter plate prior to contacting the spreader plate.

4. The breading machine of claim 3, wherein the diverter plate comprises a plurality of holes to aid in mixing the breading material prior to the breading material contacting the spreader plate.

5. The combination of claim 1, wherein the support rod is laterally adjustably connectable to the hopper.

6. The combination of claim 1, wherein the support rod is axially adjustably connectable to the hopper.

7. The combination of claim 1, wherein the support rod is rotationally adjustably connectable to the hopper.

8. In combination with a breading machine which includes a hopper having a number of hopper sections, the improvement comprising a distribution apparatus which comprises:
- a downspout for conveying a breading material to the hopper;
- a spreader plate which is positioned between the downspout and the hopper; and
- means for adjustably supporting the spreader plate relative to the hopper;
- wherein a flow of breading material from the downspout may be distributed as desired between the hopper sections by adjusting the position of the spreader plate relative to the hopper;
- wherein the adjustable supporting means comprises a support rod which extends from the spreader plate and is adjustably connectable to the hopper, first and second block members, each of which is connected to a corresponding end of the support rod, and first and second cleat members, each of which is connected to a corresponding portion of the hopper; and
- wherein each of the first and second block members is adjustably connectable to a corresponding one of the first and second cleat members.

9. The combination of claim 8, wherein each of the first and second block members is laterally adjustably connectable to its corresponding cleat member.

10. The combination of claim 8, wherein each of the first and second block members is axially adjustably connectable to its corresponding cleat member.

11. The combination of claim 8, wherein the support rod is rotatably connectable to each of the first and second block members.

12. A breading machine which comprises:
- a hopper which includes a number of hopper sections; and
- a spreader plate which is adjustably supported between the hopper sections and a flow of breading material entering the hopper;
- wherein the distribution of the breading material between the hopper sections may be adjusted by adjusting the position of the spreader plate relative to the hopper; and
- wherein the spreader plate is connected to a support rod which in turn is at least one of laterally and axially adjustably connectable to the hopper.

13. The breading machine of claim 12, wherein the support rod is laterally adjustably connectable to the hopper.

14. The breading machine of claim 12, wherein the support rod is axially adjustably connectable to the hopper.

15. The breading machine of claim 12, wherein the support rod is rotatably adjustably connectable to the hopper.

16. The breading machine of claim 12, further comprising:
- a downspout for conveying a breading material to the hopper; and
- a diverter plate which is adjustably supported proximate a discharge end of the downspout;
- wherein the breading material flowing through the downspout will engage the diverter plate prior to contacting the spreader plate.

17. The breading machine of claim 16, wherein the diverter plate comprises a plurality of holes to aid in mixing the breading material prior to the breading material contacting the spreader plate.

18. A breading machine which comprises:
- a hopper which includes a number of hopper sections;
- a spreader plate which is adjustably supported between the hopper sections and a flow of breading material entering the hopper;
- wherein the distribution of the breading material between the hopper sections may be adjusted by adjusting the position of the spreader plate relative to the hopper;
- wherein the spreader plate is connected to a support rod which in turn is adjustably connectable to the hopper;
- first and second block members, each of which is connected to a corresponding end of the support rod; and
- first and second cleat members, each of which is connected to a corresponding portion of the hopper;
- wherein each of the first and second block members is adjustably connectable to a corresponding one of the first and second cleat members.

19. The breading machine of claim 18, wherein each of the first and second block members is laterally adjustably connectable to its corresponding cleat member.

20. The breading machine of claim 18, wherein each of the first and second block members is axially adjustably connectable to its corresponding cleat member.

21. The breading machine of claim 18, wherein the support rod is rotatably connectable to each of the first and second block members.

\* \* \* \* \*